(12) United States Patent
Mackenzie

(10) Patent No.: US 9,733,057 B2
(45) Date of Patent: Aug. 15, 2017

(54) BLIND HOLE LOCATION TOOL

(71) Applicant: THE BOEING COMPANY, Chicago, IL (US)

(72) Inventor: Rod M. Mackenzie, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 146 days.

(21) Appl. No.: 14/865,567

(22) Filed: Sep. 25, 2015

(65) Prior Publication Data

US 2017/0089686 A1    Mar. 30, 2017

(51) Int. Cl.
    *G01B 5/25*    (2006.01)

(52) U.S. Cl.
    CPC .................. *G01B 5/25* (2013.01)

(58) Field of Classification Search
    CPC ........................................... G01B 5/25
    USPC .................... 33/613, 645, 562, 563
    See application file for complete search history.

(56) References Cited

U.S. PATENT DOCUMENTS

| | | | | |
|---|---|---|---|---|
| 6,427,356 B1* | 8/2002 | Schamal | ............. | G01B 5/0025 33/520 |
| 7,080,461 B2* | 7/2006 | Jensen | .................. | G01B 3/22 33/501.05 |
| 7,329,076 B2* | 2/2008 | Hartney | ............... | F16B 39/028 33/520 |
| 8,468,709 B2* | 6/2013 | Akdeniz | ................ | B29C 73/24 33/563 |
| 2005/0217131 A1* | 10/2005 | Varsell | ..................... | G01B 3/14 33/562 |
| 2006/0032069 A1* | 2/2006 | Jensen | ..................... | G01B 3/22 33/645 |
| 2008/0104855 A1* | 5/2008 | Kim | ......................... | G01B 3/28 33/836 |
| 2012/0324825 A1* | 12/2012 | Vrame | ................. | E04G 21/185 52/745.21 |
| 2014/0366395 A1* | 12/2014 | Ward | ..................... | E05B 17/06 33/613 |

* cited by examiner

*Primary Examiner* — G. Bradley Bennett
(74) *Attorney, Agent, or Firm* — Marshall, Gerstein & Borun LLP

(57) ABSTRACT

An adjustable template includes a template base member defining at least one opening which extends through the template base member. The adjustable template further includes a locater guide member associated with the at least one opening, wherein a width dimension of the locater guide member is smaller than a width dimension of the at least one opening permitting the locater guide member to move within the at least one opening. An opening defined by the locater guide member extends through the locater guide member wherein a central axis of the opening extends in a direction parallel to and offset from a central axis of the locater guide member. A method of locating a position in alignment of a blind hole defined by a first member is also included. The method includes the steps of positioning a template base member and positioning a locater guide member.

20 Claims, 6 Drawing Sheets

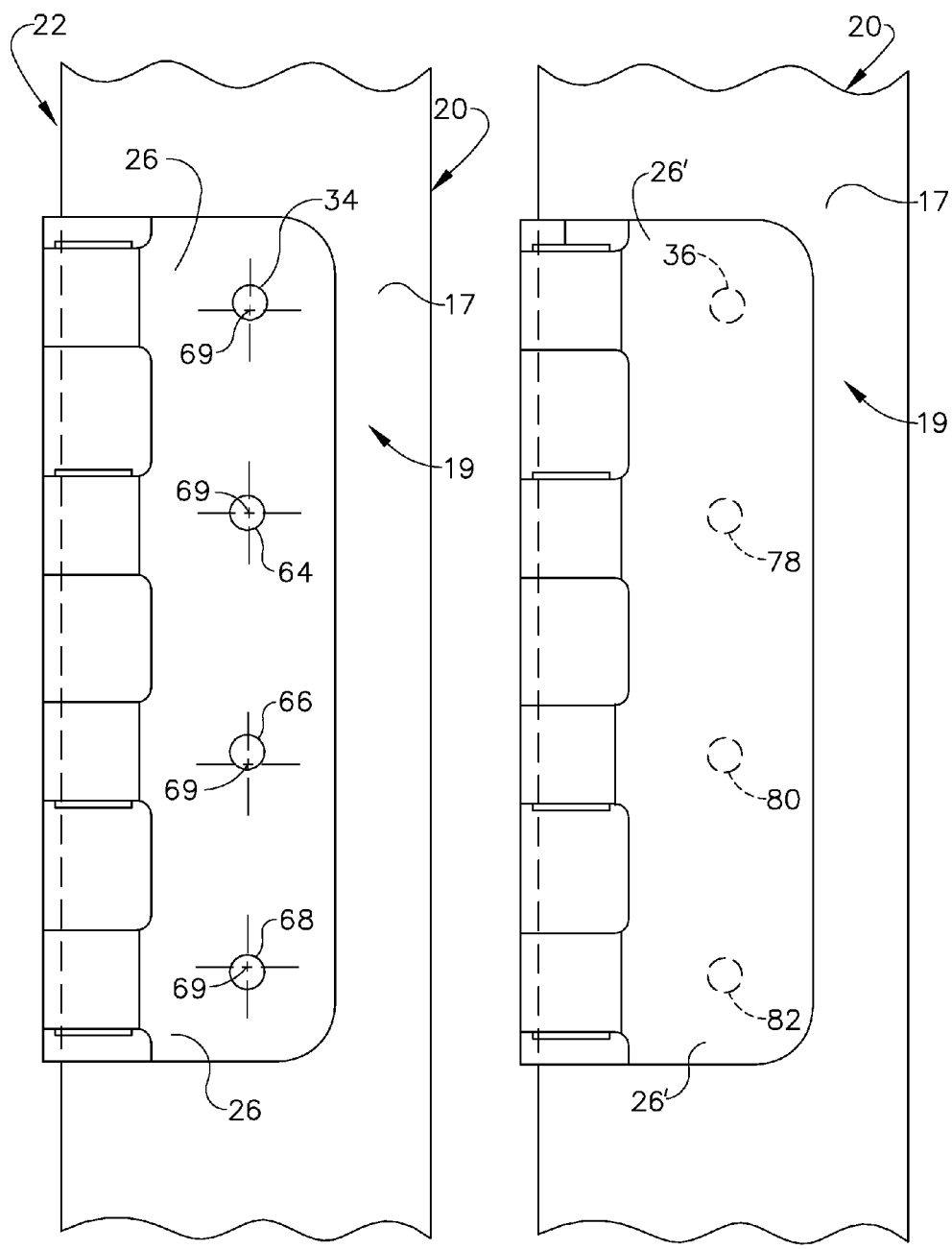

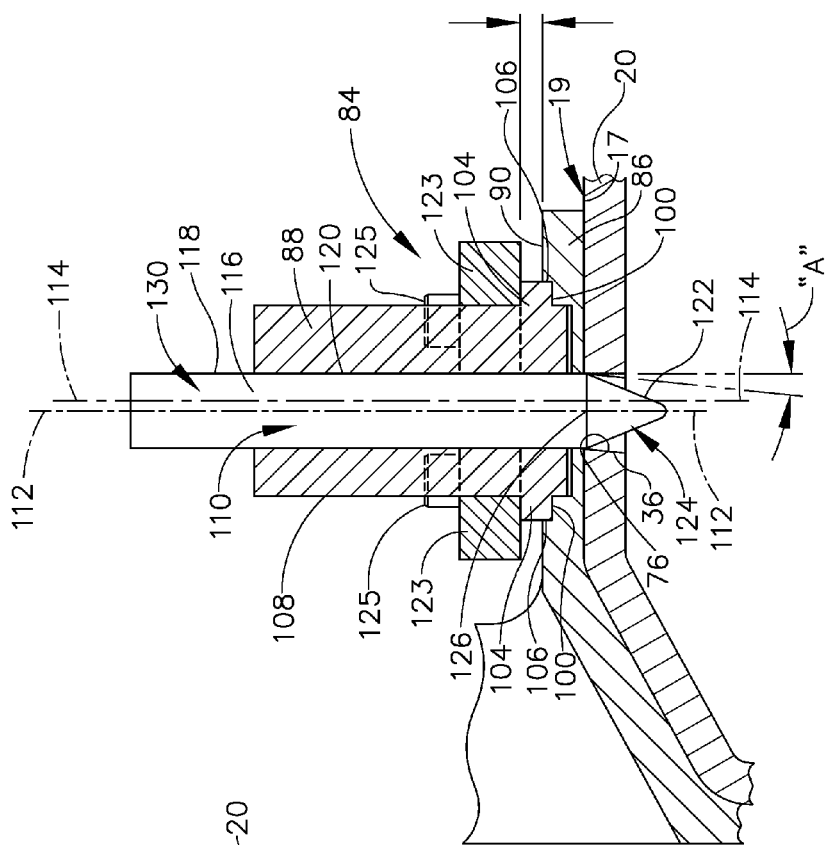
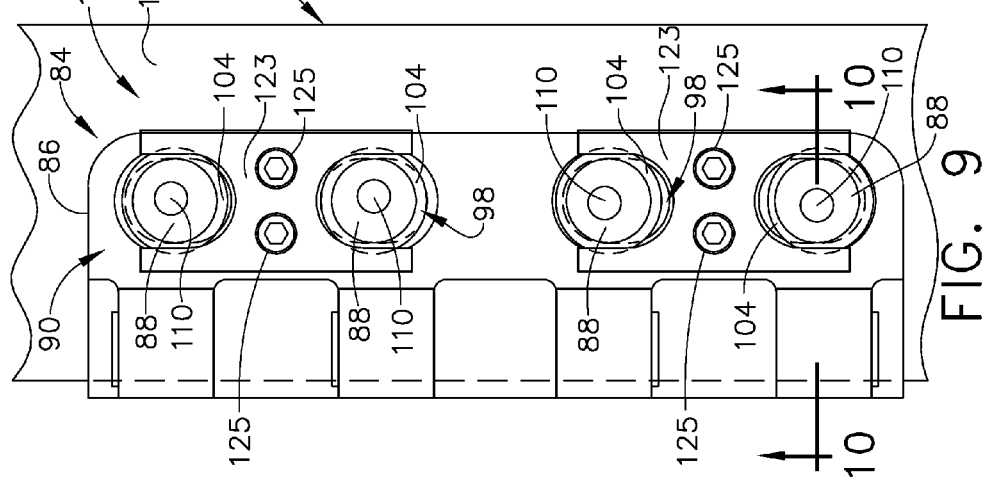
FIG. 10
FIG. 9

BLIND HOLE LOCATION TOOL

FIELD

The present invention relates to an apparatus and method for locating a blind hole positioned in a first member which is to receive a portion of a fastener to secure together the first member to a second member in overlying relationship to the first member, and more particularly, locating a position of the blind hole for machining an opening or hole to extend through the second member for receiving another portion of the fastener, such that the opening or hole machined into the second member is in alignment with the opening or blind hole of the first member.

BACKGROUND

At times, it is a difficult task to properly secure together a first member to a second member, a replacement part, which is positioned to overlie the first member. This is particularly the case where the first member has a first opening or blind hole extending there-through for receiving a portion of a fastener which will secure the first and second members together. A position needs to be located or established on the second member to machine or bore a second opening through the second member so as to position the first and second holes in alignment with each other. Alignment is needed in order for the fastener to extend through the first and second openings without making binding contact with sidewalls of the first and second openings. This task becomes more challenging with the second member positioned to overlie the first member. The second member or replacement part visually impedes the installer from seeing the first opening or blind hole of the first member thereby making it more difficult to locate a position in the second member in which to machine a new second opening which will align with the blind hole.

Alignment of the first and second openings of the first and second members, respectively, is important. The first and second openings are used to receive a fastener and proper alignment of the first and second openings provide a reliable and long lasting securement between the first and second members. For example, in the instance the fastener is a bolt with a nut, the bolt is positioned to extend through the first opening of the first member and through the machined opening of the second member such that the nut can be tightened to complete the securement. Optimally, the bolt should pass through the first and second openings without binding against either of the inner sidewalls of the first and second openings which extend through the first and second members, respectively. Thus, without the bolt binding to either of inner sidewalls of the first and second openings, the nut can be tightened securing the first and second members together with the nut evenly distributing a force across the nut against a surface of the first member. This even distribution of force prevents an undesired bending moment from being imparted to the bolt.

In working to locate the proper position on the second member in which to machine the second opening or hole through the second member which will align with first opening or blind hole of the first member, an installer may employ a back marking method. The back marking method has the installer reaching behind the first member and extending a marking tool through the first or blind opening to mark a back surface of the second member in alignment with the first blind opening. This back marking method, could provide a guide in which to machine the second opening in the second member to be in alignment with the first blind opening. However, this marking process can be very difficult to accomplish in situations where the first member is positioned in a confined or restricted area making access to the blind hole not readily available. This restricted access not only can make the marking a challenging or impossible task, but even if access can be achieved, this process may also lead to inaccurate marking of the second member.

Inaccuracies in marking the proper location in the second member utilizing the back marking method can arise in extending the marking tool through the first opening or blind hole toward the second member. In an example wherein the first and second members may be spaced apart from one another, the extending of the marking tool through the blind hole toward the second member may encounter the marking tool extending angularly away from a central axis of the blind hole of the first member. The angular extending marking tool will result in marking a position in the second member out of alignment with the central axis of the first opening or blind hole. The subsequent machining of the second hole, in this instance, will position the second opening out of alignment with the blind hole of the first member.

Other methodologies have been employed to locate positions for machining a second opening through a second member, which will overlie a first member. Such methodologies include employing repro-rubber or putty castings. These methods often require confining the rubber or putty substance to form a mold for creating a casting. The rubber or putty material is packed into the confinement which includes the first opening or blind hole of the first member. The casting will indicate a location of the blind hole however, this will only be effective with preservation of the locations of the first member and second members relative to each other. With preservation of the first and second members relative location with one another and the casted location of the blind hole, positioning of the hole to be machined in the second member that will be in alignment with the blind hole may be accomplished. The proper location of placing the second member into position for securement needs to be identified to assure the alignment of the machined hole and the blind hole is accomplished. This is a time consuming process in which inaccuracies as misalignment of the blind hole of the first member and the second opening of the second member can be infused in the process of fastening the first and second members together.

SUMMARY

An adjustable template includes a template base member defining at least one opening which extends through the template base member. The adjustable template further includes a locater guide member associated with the at least one opening, wherein a width dimension of the locater guide member is smaller than a width dimension of the at least one opening permitting the locater guide member to move within the at least one opening. An opening is defined by the locater guide member and extends through the locater guide member wherein a central axis of the opening extends in a direction parallel to and offset from a central axis of the locater guide member.

A method of locating a position in alignment of a blind hole defined by a first member includes the step of positioning a template base member, which defines at least one opening which extends through the template base member, to overlie the first member such that the blind hole is visible through the at least one opening. The method further includes the step of positioning a locater guide member, which defines an opening which extends through the locater guide member in which a central axis of the opening extends in a direction parallel to and offset from a central axis of the locater guide member, wherein the locater guide member has a smaller dimension than a dimension of the at least one opening of the template base member such that the locater guide member moves within the at least one opening.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 3 is a plan view of a portion of the hinge to be replaced of FIG. 2, as seen from the direction designated as line 3-3 in FIG. 2, wherein this portion of the hinge is overlying a portion of an end portion of the door;

FIG. 4 is the plan view of FIG. 3 without the portion of the hinge to be replaced and with a portion of a blank new hinge (the replacement hinge without holes for securement) instead overlying the portion of the end portion of the door with blind holes of the door, shown in phantom, to which the portion of the new hinge will be secured;

FIG. 9 is the plan view of FIG. 5 wherein locating guide members are locked into a locating position within openings defined in the template base member with each of the acentric openings of the locating guide members aligned with one of the blind holes of the end portion of the door; and FIG. 10 is a section view along line 10-10 of FIG. 9 with a locater pin positioned extending through the acentric opening of the locating guide member and into a blind hole of the end portion of the door.

DESCRIPTION

Figure 1:
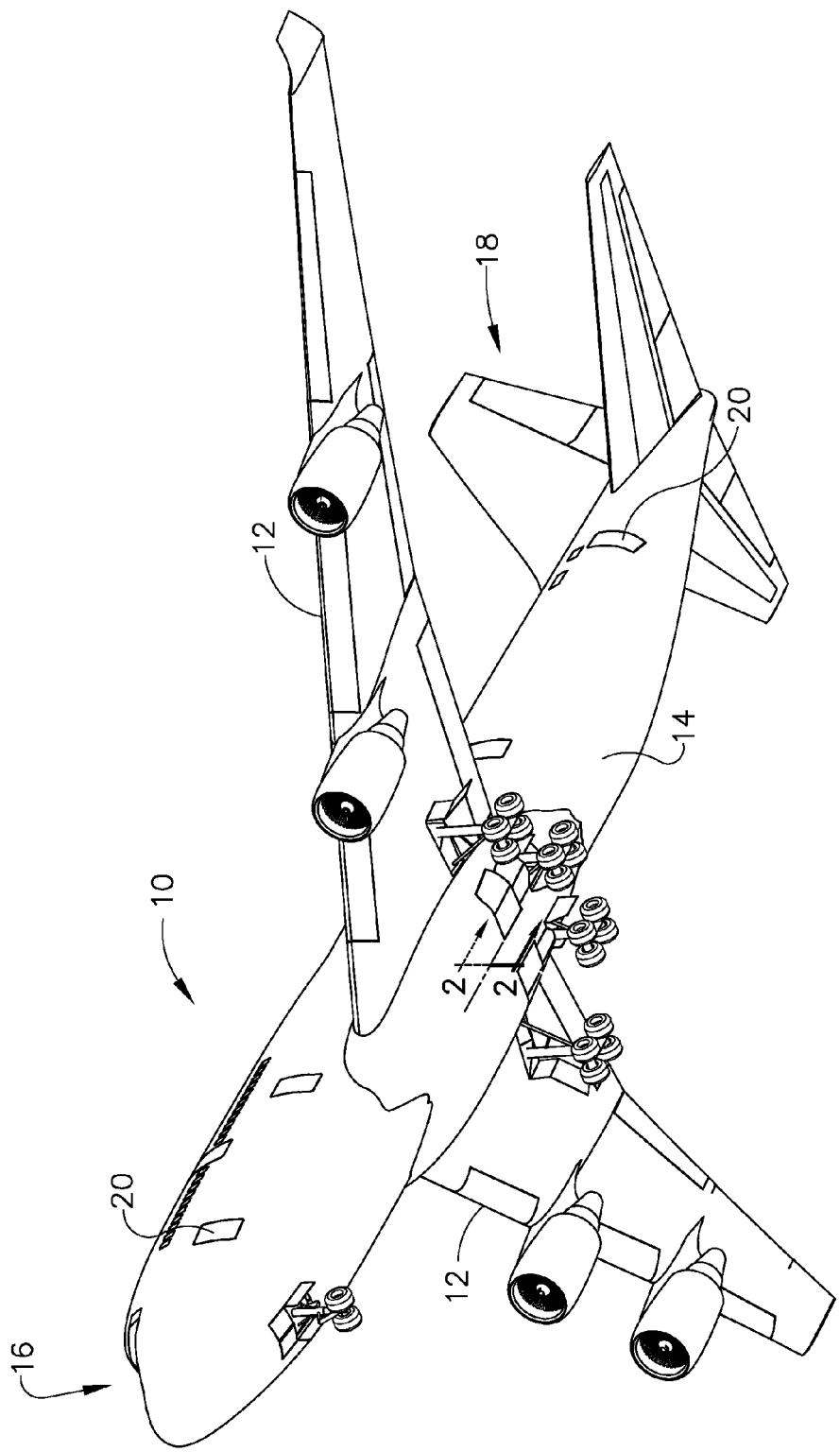
FIG. 1 is a perspective view of an aircraft.

In referring to FIG. 1, airplane 10 is shown including wings 12, fuselage 14, nose section 16, tail section 18 and door 20. Airplane 10 as any other transportation equipment, manufacturing equipment, buildings, machinery, etc., or any other fabricated item which is placed into use, from time to time, requires maintenance and repairs. The repairs may, in certain instances, include the removal of a worn part or one that is in disrepair. The removal of such a part will require the installation of a replacement part. The replacement part will often be secured to the fabricated item with fastener(s) that will extend through openings or holes positioned in the fabricated item in order to secure the replacement part to the fabricated item.

In the course of installing a replacement part, the installer may encounter blind holes positioned in the originally fabricated item. The blind holes are characterized as holes of the original fabricated item through which a fastener for securing the replacement part passes through to secure the replacement part to the original fabricated item. The blind hole(s) is visually blocked from the installer with placing the replacement part in a position it will occupy when installed. The installer will need to be able to locate positions on the replacement part in which a hole(s) can be machined that will align with the blind hole(s) of the fabricated item for installation. As has been discussed earlier, it is important for the blind hole and the subsequently machined hole of the replacement part align at the time the replacement part is secured to the fabricated item. The proper alignment provides a balanced force distribution to the fastener and promotes reliable long term securement.

An adjustable template, the subject of the present disclosure, will beneficially assist the installer in locating the proper location of the hole(s) associated with the replacement part which will need to be machined. The proper location of the machined holes will position the machined holes in alignment with corresponding blind holes of the fabricated item making the securement of the replacement part optimal and reduce an occurrence of imparting unwanted bending forces to the fastener.

One of the embodiments of the adjustable template will be discussed herein in detail. However, this example is merely one example of numerous constructions of the adjustable template contemplated. The example discussed herein will employ an embodiment of an adjustable template that will locate the position(s) for machining hole(s) in a portion of a replacement hinge to be secured to door 20 of an aircraft 10. The machined hole(s) of the replacement part or hinge will properly align with the existing blind hole(s) of door 20. Similarly this is done so as to secure the replacement hinge to the frame of aircraft 10, such that the replacement hinge secures door 20 to aircraft 10. Other embodiments of this adjustable template may include many other shapes and configurations for the adjustable template to accommodate various shapes and configurations of replacement parts that will be secured to fabricated items which may also have various shapes and configurations to which the replacement part is to be secured.

Figure 2:
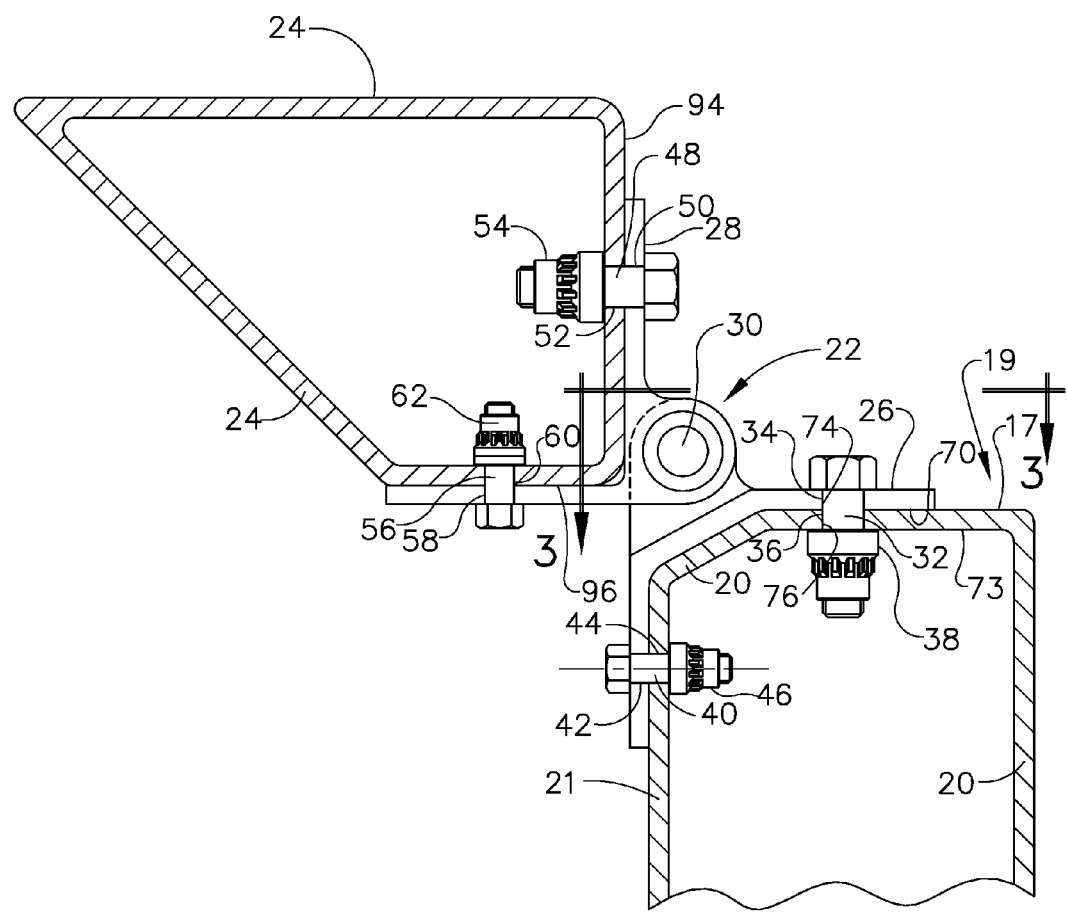
FIG. 2 is a partial section view of a door and frame member of the aircraft of FIG. 1, wherein the door and frame member are connected together with a hinge which is to be replaced.

In referring to FIG. 2, hinge 22 secures door 20 to a keel 24 of fuselage 14 of aircraft 10. Hinge 22 is shown as it was installed in the original fabrication of aircraft 10. Hinge 22 includes a first hinge component 26 and a second hinge component 28. First hinge component 26 is secured to door 20 and second hinge component 28 is secured to keel 24 of fuselage 14. Hinge pin 30 links first and second hinge components 26 and 28 together such that first and second hinge components 26 and 28 rotate about hinge pin 32.

Bolts and nuts are employed to fixedly secure each of the first hinge component 26 and second hinge component to door 20 and keel 24, respectively. With respect to first hinge component 26, first bolt 32 passes through opening or hole 34 defined in first hinge component 26 and passes through opening or hole 36 defined in end portion 19 of door 20. Nut 38, when tightened, secures first hinge component 26 to end portion 19 of door 20. Similarly, second bolt 40 passes through opening or hole 42 defined in first hinge component 26 and passes through opening 44 defined in side portion 21 of door 20. Nut 46, when tightened, also secures first hinge component 26 to door 20.

With respect to second hinge component 28, third bolt 48 passes through opening or hole 50 defined in second hinge component 28 and passes through opening or hole 52 defined in keel 24. Nut 54, when tightened, secures second hinge component 28 to keel 24. Similarly, fourth bolt 56 passes through opening or hole 58 defined in second hinge component 28 and passes through opening or hole 60 defined in keel 24. Nut 62, when tightened, also secures second hinge component 28 to keel 24.

In this example, at the time just prior to installation of first and second hinge components 26 and 28, neither component had openings or holes 34 and 42 of first hinge component 26 and or openings or holes 50 and 58 of second hinge component 28. Additionally, door 20 did not have openings or holes 36 and 44 and keel 24 did not have openings or holes 52 and 60. The installation of the original hinge 22 involved the installer placing hinge 22 in overlying relationship to door 20 and keel 24 and then drilling continuously through hinge 22 and door 20 and continuously through hinge 22 and keel 24. This drilling technique created hole pairings 34, 36; 42, 44; 50, 54; and 58, 60. After the hole(s) were drilled, the fasteners or in this instance, first, second, third and fourth bolts 32, 40, 48 and 56 were extended through their respective hole combinations of 34, 36; 42, 44; 50, 52; and 58, 60 and nuts 38, 46, 54 and 62 were tightened securing door 20 to keel 24 with hinge 22.

In referring to FIG. 3, first hinge component 26 is shown overlying end portion 19 of door 20. First bolt 32, as are other bolts normally used to secure this portion of first hinge component 26 to end portion 19 of door 20, have been removed. In this view, opening or hole 34 which normally receives bolt 32 can be clearly seen. Similarly, openings or holes 64, 66 and 68 are also unobstructed with the removal of bolts that would otherwise secure first hinge component 26 to end portion 19 of door 20 in passing through openings or holes 64, 66 and 68. Since openings or holes 34, 64, 66 and 68 were hand drilled at the time of installing the original hinge 22, openings or holes 34, 64, 66 and 68 are not necessarily positioned in vertical alignment nor are they necessarily equally vertically spaced apart from one another. Cross hair indicators 69 indicate a position a center would have been located for each of holes 34, 64, 66 and 68 should these holes been positioned in vertical alignment with one another.

Since openings or holes 34, 64, 66 and 68 were drilled with first hinge component 26 in position overlying end portion 19 of door 20, opening or hole 36 positioned on door 20 was drilled as the installer's drill passed through first hinge component 26 forming hole 34 and then entered end portion 19 of door 20. This drilling process placed at least the center of opening 34 positioned on a lower face 70 of first hinge component 26, as seen in FIG. 2, substantially in alignment with a center of opening 36 at upper face or flattened portion 17 of end portion 19 of door 20. Unless the drill was maintained in perpendicular orientation relative to first hinge component 26 and end portion 19 of door 20, inner sidewalls 74 and 76 of openings 34 and 36, respectively, would otherwise angularly deviate from a perpendicular relationship with respect to lower surface 73 of end portion 19 of door 20. Without inner sidewalls 74 and 76 in a perpendicular relationship with lower surface 73, tightening of nut 38 on bolt 32 will cause imparting an imbalanced force across nut 38 on lower surface 73 and will also result in imparting a bending moment to bolt 32.

In referring to FIG. 4, this view of end portion 19 of door 20 is seen with a blank (without openings or holes) first hinge component 26'. First hinge component 26' is positioned overlying opening or now blind hole 36, shown in phantom, defined in end portion 19 of door 20. First hinge component 26' is being prepared to be a replacement hinge component. Once proper positioning has been determined on the blank first hinge component 26' for holes that will align with blind holes 36, 78, 80 and 82, shown in phantom, defined by end portion 19 of door 20 positioned underneath first hinge component 26' blank, the holes can then be machined into replacement first hinge component 26'.

Opening or blind hole 36 defined by door 20, as are other openings or blind holes 78, 80 and 82 defined by door 20, are blind holes since their position or location is visually blocked or impaired with placing blank first hinge component 26' in overlying position over openings 36, 78, 80 and 82. Establishing positions of openings 36, 78, 80 and 82 such that those positions can be used to machine aligned holes in first hinge component 26' blank, is required to properly secure first hinge component 26' as a replacement for original first hinge component 26, to end portion 19 of door 20. With openings properly machined into first hinge component 26' which align with openings or blind holes 36, 78, 80 and 82, first hinge component 26' can then be installed onto door 20 as a replacement for a portion of hinge 22. It should be appreciated that second hinge component 28 can be replaced using the same process as described above for creating replacement first hinge component 26'.

Figure 5:
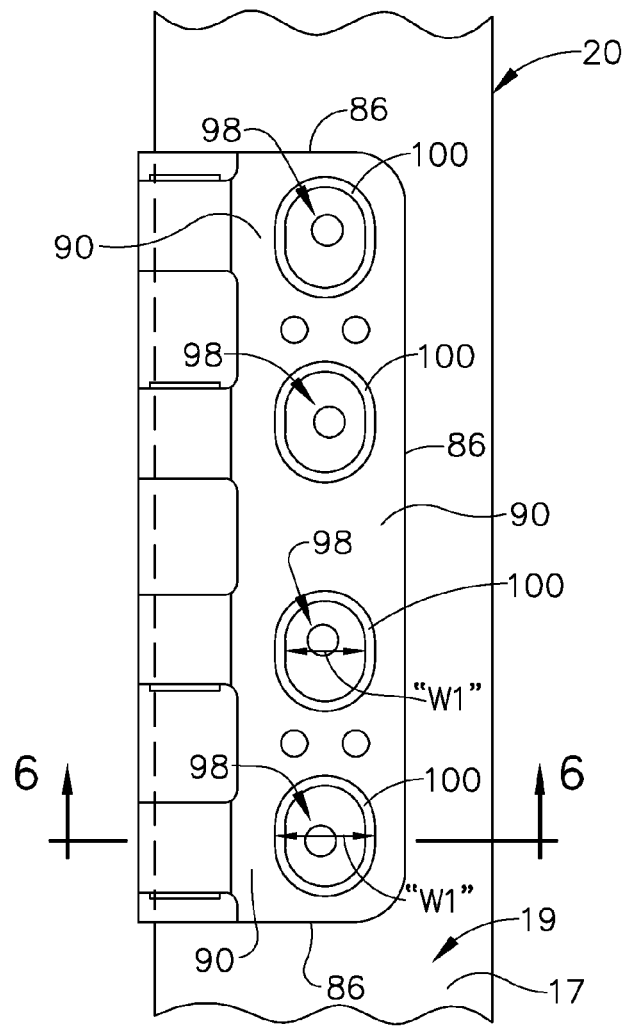
FIG. 5 is the plan view of FIG. 3 without the portion of the hinge to be replaced and instead a portion of the template base member for locating blind holes in the end portion of the door overlying the end portion of the door.
Figure 6:
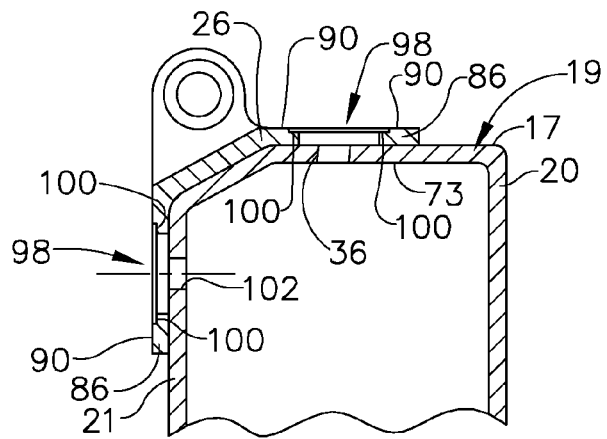
FIG. 6 is a partial cross section view as seen along line 6-6 in FIG. 5 with a portion of the template overlying the end portion of the door.

In referring to FIGS. 5-8, adjustable template member 84 is shown which includes template base member 86 and locater guide member 88. In referring to FIGS. 5 and 6, template base member 86 is shown having exterior planar surface 90. In this example, template base member 86 with exterior planar surface 90, is configured to similarly replicate a configuration of exterior planar surface 90 of first hinge component 26 (which is to be replaced). Template base member 86 is positioned to overlie, as seen in FIG. 6, corresponding relatively flat surface 17 of end portion 19 of door 20 and side portion 21 of door 20. Similarly, another template base member (not shown) is configured to overlie relatively flat surfaces 94 and 96, of keel 24, as seen in FIG. 2. This template base member would be used to replicate second hinge component 28. It should be appreciated that template base member 86 can also take on other shapes or configurations, as mentioned above, such as a curved shape or configuration for replacing a part that has a curved shape or configuration and which may also have a curved underlying member to which the curved replacement part is to secure.

Template base member 86 defines at least one opening 98. In this example, four such openings are shown in FIG. 5 which would be positioned to overlie end portion 19 of door 20. Another four such openings 98 (not shown), in this example, are positioned along template base member 86 which would overlie side portion 21 of door 20. Template base member 86 defines, in this example, each of these openings 98 to be configured in an obround shape, as seen as openings 98 in FIG. 5. Another surface 100 is positioned recessed from exterior planar surface 90 and positioned to extend around the periphery of each of the at least on openings 98.

Each of the four openings 98 shown in FIG. 5 are positioned over one of the openings or blind holes 36, 78, 80 and 82, as seen in FIG. 4. The installer will visually see one of blind holes 36, 78, 80 and 82 through one of the four openings 98, in this example. Not shown but similarly positioned, four openings 98 which overlie side portion 21 of door 20 will also have one of the four openings 98 visually aligned with one of opening 102 and the other three (not shown) openings defined in side portion 21.

Figure 7:
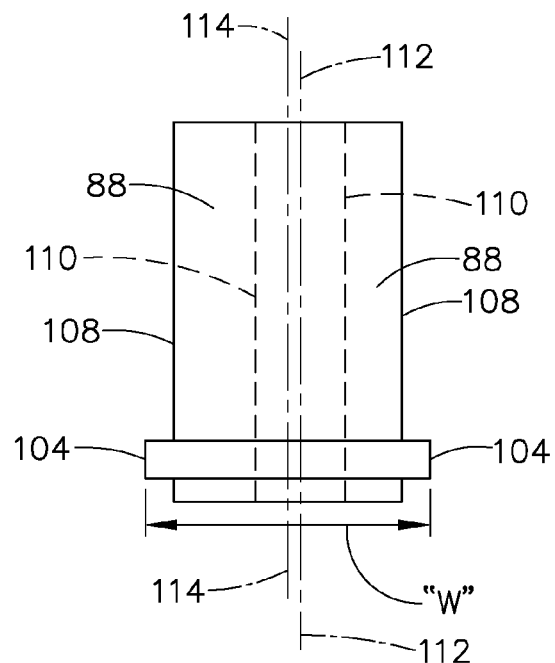
FIG. 7 is a side elevation view of a locating guide member with an acentric positioned opening extending through the locating guide member as indicated in phantom.
Figure 8:
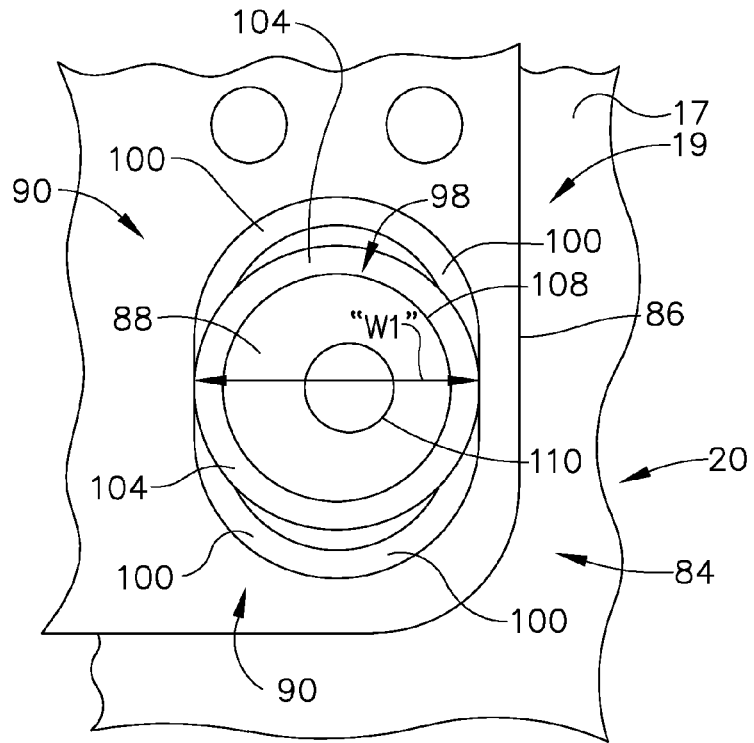
FIG. 8 is an enlarged partially broken away portion of the plan view of the template base member as seen in FIG. 5 with a locating guide member of FIG. 7 positioned in an opening defined in the template base member.

In referring to FIGS. 7 and 8, with template base member 86 positioned to overlie, in this embodiment, end portion 19 of door 20, locater guide member 88 is inserted into opening 98. A width dimension of locater guide member 88 is smaller than a width dimension of opening 98 which permits locater guide member 88 to freely move within confines of opening 98. At least one locater guide member 88 is associated with each opening 98. In other embodiments, each opening 98 can be dimensioned to accommodate multiple locater guide members 88 within each opening 98.

Each locater guide member 88 has flange 104, as seen in FIGS. 7 and 8, which extends about locater guide member 88 and in a direction away from locater guide member 88. Flange 104 is positioned to rest on surface 100, which is recessed from exterior planar surface 90 of template base member 86. Width dimension "W" of flange 104, as seen in FIG. 7, is smaller than a width dimension "W1", as seen in FIG. 8, which extends across opening 98 and is bounded by sidewall 106 which extends from exterior planar surface 90 to other surface 100 recessed from exterior planar surface 90, as seen in FIG. 10. Thus, with flange 104 positioned on other surface 100 recessed from exterior planar surface 90, locater guide member 86 can be freely rotated and/or translated within the opening 98 confined by sidewall 106.

Locater guide member 88 has an exterior surface 108 which extends in a circular configuration about locater guide member 88. In this embodiment, at least a portion of locater guide member 86 forms a cylindrical shape on its exterior surface 108. Locater guide member 88 also defines an opening 110 which extends through a length of locater guide member 88 with a central axis 112 extending in a direction parallel to and positioned offset from central axis 114 of locater guide member 88, as seen in FIG. 10. Opening 110 defines a circular cross section shape as would be provided by a cross section taken perpendicular to central axis 112 and maintains that circular shape throughout the length of opening 110 as it extends through locater guide member 88, as seen in FIGS. 7 and 8. The offset or acentric location of opening 110 allows the alignment of opening 110 to reach a larger area of positions beneath locater guide member 88, in seeking and locating blind openings as discussed below, with locater guide member 88 being rotated and/or translated within opening 98, than if the central axis 112 of opening 110 coincided with the central axis 114 of locater guide member 88.

Locater pin 116, as seen in FIG. 10 has at least a portion of exterior surface 118 which forms a rounded configuration of a cylinder. Locater pin 116 has a width dimension slightly smaller than a dimension of opening 110 of locater guide member 86, such that locater pin 116 can be freely slid into and out of opening 110 and yet its lateral direction of movement is strictly confined by sidewalls 120 of opening 110. An end portion 122 of locater pin 116 forms a conical portion 124. Conical portion 124, as will be discussed in more detail below, locates blind holes and locater pin 116 provides positioning of the blind holes spaced apart from the blind hole to properly locate holes to be machined into replacement hinge component 26'.

With locater pin 116 positioned in opening 110 of locater guide member 88, locater guide member 88 can be rotated and translated within opening 98 of template base member 86. With opening 110 containing locater pin 116 becoming positioned over opening or blind hole 36, conical portion 124 of locater pin 116 penetrates opening or blind hole 36, as seen in FIG. 10. Conical portion 124 permits locater pin 116 to penetrate blind hole 36 so long as sidewall 76 of opening 36 does not deviate from perpendicular to surface 73, of door 20, greater than one percent. With one percent of less angular deviation, sufficient penetration will be accomplished by locater pin 116 such that center 126 of opening or blind hole 36 aligned with surface 17 of end portion 19 is located. With information provided to the installer regarding the existence of an angular deviation in sidewall 76, as shown as angle "A" in FIG. 10, which is one percent or less from being perpendicular to surface 73, the installer can insert a reamer device through opening 110, with locater guide member 88 secured to template base member 86 as described below. The reamer device can be used to increase the size of opening 36 removing any instance of sidewall 76 potentially binding onto bolt 32. With the proper position now located with respect to blind hole 36 by locater pin 116, machining opening 34 into replacement first hinge component 26' can be accomplished. Should a deviation of greater than one percent represented by angle "A" be reported to the installer, the installer can ream the existing blind hole to remove that angular deviation prior to aligning locater pin 116 into the blind opening and locating the position for machining hole 34 in replacement first hinge component 26'.

With conical portion 124 of locater pin 116 positioned within and properly penetrating blind hole 36, the opposing end 130 of locater pin 116 extends out of opening 110 of locater guide member 86. Locater pin 116 now identifies the location of blind hole 36 at a position spaced apart from blind hole 36. This identification of the blind hole 36 position provides a machinist the location for drilling opening 34 in replacement first hinge component 26' that will now align with blind hole 36. This position, identified by locater pin 116 is preserved with the application of bracket 123, In this example, bracket 123 has an "H" configuration, as seen in FIG. 9. Bracket 123 is secured to template base member 86 with two screw fasteners 125. As seen in FIG. 10, bracket 123 overlies and abuts flange 104 of locater guide member 88. With screwing fasteners 125 into template base member 86, bracket 123 pushes against flange 104, which in turn, pushes flange 104 tightly against other surface 100 thereby locking locating guide member 88 and opening 110 in a fixed position relative to template base member 86. With locking locating guide member 88 into position, the location established of blind hole 36 is preserved for the machinist to properly drill a hole into the replacement part to align that machined hole with blind hole 36 and thereby provide proper fastening of the replacement part.

As can be appreciated, adjustable template 84 locates a position in alignment with an opening or blind hole 36 so as to properly machine a replacement part with a hole or opening that will align with blind hole 36. Thus, when the replacement part is secured with a fastener extending through blind hole 36 and the machined hole, sidewall 76 of blind hole 36 will not bind onto fastener or bolt 32. A method for locating a position in alignment of blind hole 36 will be discussed. With respect to the method for locating the position in alignment with blind hole 36, door 20 will herein also be referred to as first member 20 and first hinge component 26' will also be referred to as second member 26'. Blind hole 36 will be also be defined by first member 20.

The method includes positioning template base member 86, which defines at least one opening 98 and which extends through the template base member 86, is positioned to overlie first member 20 such that blind hole 36 is visible through at least one opening 98. The method includes positioning into opening 98 locater guide member 88, which defines acentric opening 110 and which extends through locater guide member 88. Opening 110 has a central axis 112 which extends parallel to and is positioned offset from central axis 114 of locater guide member 88. Locater guide member 88 has a smaller dimension than a dimension of at least one opening 98 of template base member 86 such that locater guide member 86 moves within at least one opening 98.

Template base member 86 defines exterior surface 90 and other surface 100 positioned recessed from exterior surface 90 as described above. Other surface 100 extends about a periphery of the at least one opening 98. Locater guide member 88 provides flange 104 positioned to extend about and away from locater guide member 88 and configured to abut other surface 100 of the template base member 86.

With opening 98 in position over blind hole 36, such that blind hole 36 is visible to the installer through opening 98, locater guide member 88 is positioned in opening 98 and the method further includes the step of inserting locating pin 116 into opening 110 of locater guide member 88. At this time, the installer moves locater guide member 88 within opening 98 with using at least one of a motion of rotation and translation of locater guide member 88 relative to template base member 86. Flange 104 moves along on other surface 100 of template base member 86 and is confined by sidewall 106. The installer by moving locater guide member 88 into different locations or positions within opening 98, opening 110 carrying locater pin 116 also moves into different locations or positions relative to template base member 86. Once pin locater 116 is positioned over blind hole 36, locating pin 116 enters blind hole 36. If blind hole 36 has no angularities, such that sidewall 76 does not deviate from a perpendicular relationship with surface 17 of first member or door 20, the position for machining the hole into second member or first hinge component 26' is now identified. Bracket 123, as described earlier, can be secured to template base member 86 securing locating guide member 88 and opening 110 in a locked position preserving the identification of the aligned position for the hole to be machined in second member or first hinge component 26'.

If sidewall 76 within blind hole 36 is angularly positioned, as indicated by angle "A", thereby deviating one percent or less from being perpendicular to surface 17 of door or first member 20, conical portion 124 of locating pin 116 will enter blind hole 36 and will penetrate blind hole 36 sufficiently to locate center 126 of blind hole 36 located at surface 17 of first member or door 20. Locating guide member 88 can be locked into position with bracket 123 as described above. Pin locater 116 can be removed and a reamer tool can be inserted into opening 110 and enter blind hole 36 enlarging blind hole 36 and removing the undesired angularity from sidewall 76 of blind hole 36. With this undesired angularity, which was previously identified to the installer, now removed and opening 110 position preserved with bracket 123 being secured to template base 86, the adjustable template 84 has preserved the proper position for machining a proper second opening or opening 34 in second member or replacement first hinge component 26'.

If the angularity of sidewall 76 is greater than one percent as a result of an inspection, a pre-conditioning reaming of blind hole 36 can be done to enlarge blind hole 36 to a point wherein the angularity is at or less than one percent such that conical portion 124 of locating pin 116 can properly enter and penetrate blind hole 36. If further angularity must be removed, again, a reamer tool can be guided through opening 110 of locater guide member 88 to enlarge blind hole 26 and remove the remaining angularity from sidewall 76. The process carried out will properly locate the position in which to machine hole 34 into the second member 26' and provide guidance in removing unwanted angularity from blind hole 36 of first member or door 20. With this method completed, second member or first hinge component 26' can be properly machined. Once machined, first hinge component 26' can be properly secured to first member or door 20 such that an even distribution of force is applied along nut 38 and against surface 73 of door 20. As a result, undesired bending moments are not imparted to first bolt 32.

While various embodiments have been described above, this disclosure is not intended to be limited thereto. Variations can be made to the disclosed embodiments that are still within the scope of the appended claims.

What is claimed:

1. An adjustable template, comprising:
a template base member defining at least one opening which extends through the template base member;
a locater guide member associated with the at least one opening, wherein
a width dimension of the locater guide member is smaller than a width dimension of the at least one opening permitting the locater guide member to move within the at least one opening; and
an opening defined by the locater guide member extends through the locater guide member wherein a central axis of the opening extends in a direction parallel to and offset from a central axis of the locater guide member.

2. The adjustable template of claim 1, wherein the template base member comprises an exterior planar surface.

3. The adjustable template of claim 2, wherein the exterior planar surface of the template base member comprises another surface recessed from the exterior planar surface which extends about a periphery of the at least one opening.

4. The adjustable template of claim 3 wherein the locator guide member comprises a flange which extends about the locator guide member and away from the locator guide member such that the flange is configured to rest upon the other surface recessed from the exterior planar surface.

5. The adjustable template of claim 1, further including a bracket configured to overlie the flange of the locating guide member securable to the template base member such that the bracket pushes the flange against the other surface.

6. The adjustable template of claim 1, wherein the at least one opening comprises an obround configuration.

7. The adjustable template of claim 1, wherein the locating guide member comprises an exterior surface which extends in a circular configuration.

8. The adjustable template of claim 1, wherein the opening of the locater guide member defines a circular cross section shape wherein such cross section shape extends through a length of the locater guide member.

9. The adjustable template of claim 1, further includes a locater pin.

10. The adjustable template of claim 9, wherein at least a portion of an exterior surface of the locater pin has a rounded configuration of a cylinder.

11. The adjustable template of claim 9, wherein the locating pin has a width dimension smaller than a dimension of the opening of the locater guide member.

12. The adjustable template of claim 9, wherein an end portion of the locater pin comprises a conical portion.

13. A method of locating a position in alignment of a blind hole defined by a first member, comprising the steps of:

positioning a template base member, which defines at least one opening which extends through the template base member, to overlie the first member such that the blind hole is visible through the at least one opening; and positioning a locater guide member, which defines an opening which extends through the locater guide member in which a central axis of the opening extends in a direction parallel to and offset from a central axis of the locater guide member, wherein the locater guide member has a smaller dimension than a dimension of the at least one opening of the template base member such that the locater guide member moves within the at least one opening.

14. The method of locating a position of claim 13, further including providing the template base member defines an exterior surface and other surface recessed from the exterior surface of the template base member, such that the other surface extends about a periphery of the at least one opening.

15. The method of locating a position of claim 14, further including providing a flange positioned to extend about the locater guide member and configured to abut the other surface of the template base member.

16. The method of locating a position of claim 15, further including the step of inserting a locating pin into opening of the locater guide member.

17. The method of locating a position of claim 16, further including the step of moving the locater guide member such that the flange moves on and along the other surface wherein the locater guide member moves in at least one motion of rotation relative to the template base member and translation relative to the template base member.

18. The method of locating a position of claim 17, further includes the step of the locater pin entering the blind hole of the first member with the opening of the locating guide member moved in position over the blind hole.

19. The method of locating a position of claim 18, further including the step of positioning a bracket over the flange of the locating guide member and securing the bracket to the template base member compressing the flange against the other surface.

20. The method of locating a position of claim 18, further including the step of removing the locater pin from the opening of the locater guide member and inserting a reamer tool into the opening of the locater guide member and enlarging the blind hole of the first member with the reamer tool.

* * * * *

UNITED STATES PATENT AND TRADEMARK OFFICE
CERTIFICATE OF CORRECTION

PATENT NO.       : 9,733,057 B2  
APPLICATION NO.  : 14/865567  
DATED            : August 15, 2017  
INVENTOR(S)      : Mackenzie Page 1 of 1

It is certified that error appears in the above-identified patent and that said Letters Patent is hereby corrected as shown below:

In the Claims

At Column 10, Line 43, "claim 1," should be -- claim 4, --.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*